Nov. 5, 1963   W. R. GERCHOW   3,109,335
MACHINE TOOL
Filed July 1, 1960   2 Sheets-Sheet 1
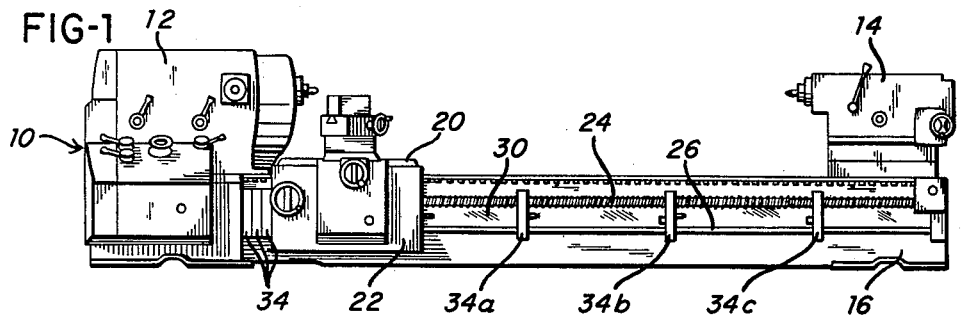
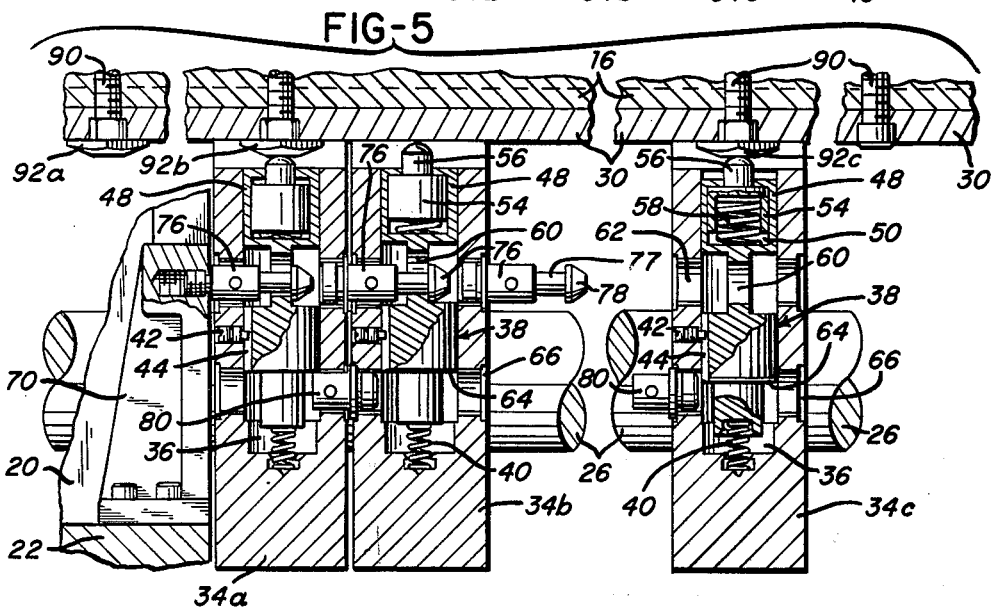
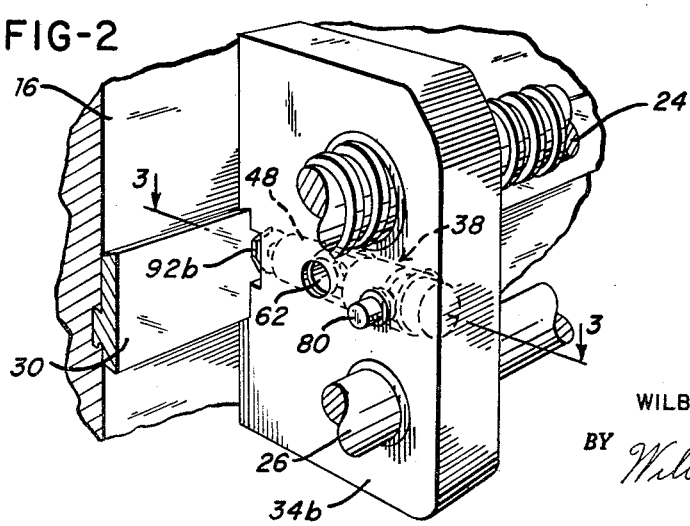
INVENTOR.
WILBUR R. GERCHOW
BY *William R Jacox*
ATTORNEY

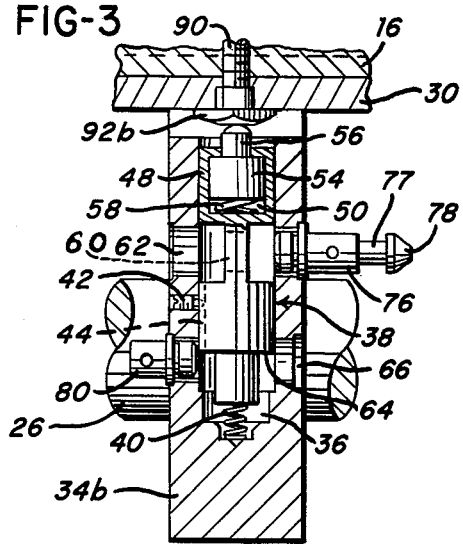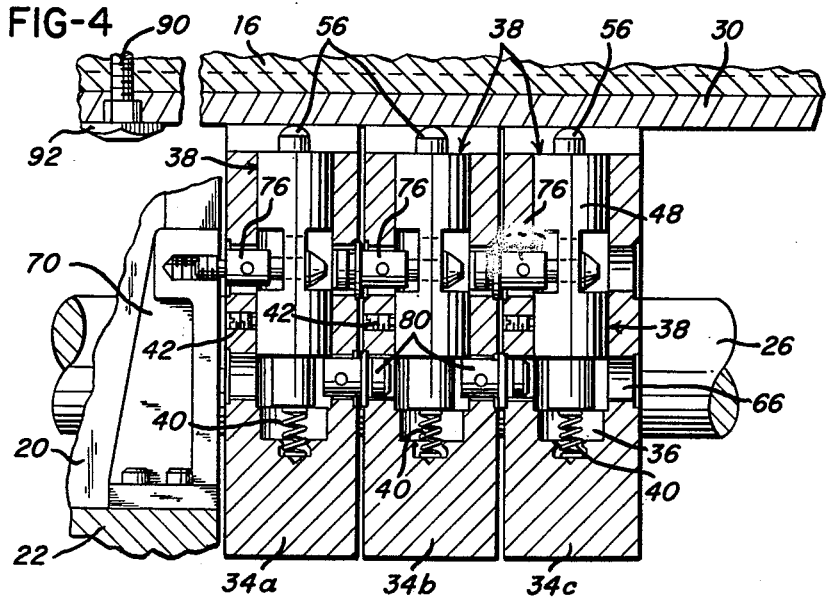

United States Patent Office 3,109,335
Patented Nov. 5, 1963

3,109,335
MACHINE TOOL
Wilbur R. Gerchow, Ann Arbor, Mich., assignor, by mesne assignments, to Sommerfeld Machine Company, Inc., Braddock, Pa., a corporation of Pennsylvania
Filed July 1, 1960, Ser. No. 40,233
2 Claims. (Cl. 82—27)

This invention relates to a machine tool. The invention relates more particularly to a machine tool such as a lathe or the like which has one or more elongate rotatable rods or shafts, normally journalled at the ends thereof. The invention relates more particularly to means for auxiliary support of such rods or shafts intermediate the ends thereof. However, the invention is not so limited in that it may be applied to various types of apparatus or devices.

A machine tool such as a lathe or the like has an elongate bed upon which a carriage is movable along the length thereof. Rod or shaft members journalled at the ends thereof, are operably connected to the carriage member for movement of the carriage or for cross-feed of a tool carried by the carriage. These rod or shaft members have considerable length along the bed of the machine tool. Therefore, conventionally there is a considerable span of each rod or shaft without any means of support. Such a span sometimes results in a sag in the rod or shaft. Such a sag is objectionable due to the fact that wobble of the rod or shaft may result during rotation thereof and damage to the support bearings at the ends of the shaft may thus occur. Also, such a sag and wobble may tend to cause inaccuracies in the work produced upon the lathe.

Thus, an object of this invention is to provide means for support of an elongate rod or shaft which is operably connected with a movable carriage so that the support means are automatically stationed at positions along the rod or shaft and which support means are automatically moved from such stations to permit the carriage to move by such stations.

Another object of this invention is to provide such support means in which support stations can be established as desired at various locations.

Another object of this invention is to provide such support means which are positive and dependable in operation.

Another object of this invention is to provide such support means which may consist of any reasonable number of support members so that a rod or shaft of any length can be supported at stations along the length thereof.

Another object of this invention is to provide such support means which are long lived and which can be produced and installed at relatively low costs.

Other objects and advantages reside in the construction of parts, the combination thereof, the method of manufacture, and the mode of operation, as will become more apparent from the following description.

In the drawing:

FIGURE 1 is a front elevational view of a lathe having support means of this invention.

FIGURE 2 is an enlarged perspective view showing a support member of this invention.

FIGURE 3 is a view taken substantially on line 3—3 of FIGURE 2.

FIGURE 4 is a sectional view showing a plurality of support members of this invention in a given position of operation.

FIGURE 5 is a sectional view, similar to FIGURE 4, showing the support members in another position of operation.

Referring to the drawing in detail, a machine tool in the form of a lathe 10 is shown in FIGURE 1. The lathe 10 has a headstock 12, a tailstock 14, and a bed 16. Movable along the bed 16 is a carriage 20 having an apron 22.

Rotatably disposed along the front of the bed 16 is a lead screw shaft 24 and a feed rod shaft 26 which are operably connected to the carriage 20 in a conventional manner. The lead screw 24 and the feed rod 26 are journalled at the ends thereof in suitable bearing members, not shown.

This invention provides means for support of the lead screw 24 and feed rod 26 at positions or stations along the length thereof, while also permitting movement of the carriage 20 along the bed 16. A rail 30 is attached to the bed 16 by any suitable means, as best shown in FIGURE 2. Slidably attached to the rail 30, as by means of a dovetail type of connection, as shown in FIGURE 2, are a plurality of support members or blocks 34, as shown in FIGURES 1, 4, and 5. The lead screw shaft 24 and the feed rod shaft 26 are shown supported by the support members or blocks 34 as these shafts 24 and 26 extend through the blocks 34. Each of the blocks 34 is movable along the shafts 24 and 26 as the blocks 34 are supported by the rail 30.

There may be any suitable number of blocks 34 in supporting relation with the shafts 24 and 26. Shown in FIGURE 1 are three blocks 34 at each side of the carriage 20. The blocks 34 at the left side of the carriage 20 are in juxtaposed relation, as the carriage 20 is at its closest position to the headstock 12. The blocks 34 at the right side of the carriage 20 are in spaced-apart relation and are disposed at support stations, as discussed below.

Each support member 34 has a cavity 36 therein, as shown in FIGURES 3, 4, and 5. Within each cavity 36 is slidably positioned a plunger 38 which is reciprocally movable toward and away from the rail 30. The plunger 38 is urged toward the rail 30 by means of a spring 40. A pin or screw 42 extends into a slot 44 of the plunger 38, as shown in FIGURE 5, and prevents rotation thereof.

The plunger 38 has a head 48 provided with a recess or cavity 50 therein, as shown in FIGURE 5. Within the cavity 50 is a plunger 54 having a knob 56 which extends from the head 48 through an opening therein. A spring 58 within the cavity 50 urges the plunger 54 in a direction toward the rail 30. Preferably, the spring 58 is somewhat stronger than the spring 40, which biases the plunger 38.

The plunger 38 has a transverse opening 60 therein which is substantially in alignment with an opening 62 in the side of the block 34. The plunger 38 also is provided with a shoulder 64 which is adjacent an opening 66 in the side of the block 34. The openings 62 and 66 are at opposite sides of the block 34.

The blocks shown in FIGURES 3, 4, and 5 are on the right hand side of the carriage 20 and for purposes of discussion herein are more specifically referred to as 34a, 34b, and 34c. The block 34a is closest to the carriage 20, while the block 34c is farthest from the carriage 20. The carriage 20 has a bracket 70 attached thereto at the left side thereof and also at the right side thereof. However, only the bracket 70 on the right side of the carriage is shown in the drawings. To each bracket 70 is secured a laterally extending stem 76. The blocks 34a and 34b are also shown as being provided with a stem 76. The stems 76 are in alignment with the openings 62 in the sides of the blocks 34 and each stem 76 is adapted to be positioned within such an opening 62 of an adjacent block 34. Each stem 76 has a body 77 and a head 78 which are adapted to move into the opening 60 of the plunger 38 of an adjacent block 34. The head 78 of each stem 76 is only slightly smaller than the opening 62 through which it is adapted to move.

The blocks 34b and 34c are each shown as being provided with a stud 80 extending laterally therefrom and adapted to be positioned within an opening 66 of an adjacent block 34. The stud 80 is adapted to engage the shoulder 64 of the plunger 38 of the block 34 within which the stud 80 is disposed.

Attached to the rail 30 in spaced-apart relation along the length thereof are a plurality of bolts or screws 90. Any one of the bolts 90 may have a protuberance 92 attached thereto to establish a support station in a manner discussed below.

Operation

Due to the fact that the shafts 24 and 26 are journalled at the ends thereof there is always a long unsupported span of each of the shafts 24 and 26. The unsupported spans of the shafts 24 and 26 might be excessive if it were not for the provision of the support members of this invention.

In FIGURE 1 the carriage 20 is shown at its extreme position toward the headstock 12. When the carriage 20 is so positioned, each of the blocks 34 to the right of the carriage 20 is located at a support station established by a protuberance 92, and the elements of each support block 34 appear substantially as shown in FIGURE 3. As shown in FIGURE 3, when a block 34 is at a support station, the knob 56 of the plunger 54 thereof is in engagement with the protuberance 92 and the plunger 54 is forced away from the rail 30. Due to the fact that the spring 58 is somewhat stronger than the spring 40, the plunger 54 forces the plunger 38 away from the rail 30 against the resiliency of the spring 40 and without appreciable additional compression of the spring 58. When the plunger is thus urged away from the rail 30, as shown in FIGURE 3, the opening 60 thereof is in substantial alignment with the opening 62.

Thus, if the carriage 20 is moved from its position adjacent the headstock 12 and toward the right, the carriage 20 first comes into juxtaposition with the block 34a. When the carriage 20 approaches the block 34a, the stem 76 attached to the right side of the carriage 20 enters the opening 62 of the block 34a and moves into the opening 60 of the plunger 38 thereof. When the carriage 20 moves farther toward the right, the block 34a is moved toward the right so that the plungers 38 and 54 thereof are no longer in alignment with a protuberance 92. Thus, the plunger 38 is moved toward the rail 30 by the spring 40 so that the opening 60 of the plunger 38 is no longer coaxial with the stem 76 of the carriage 20. Therefore, the head 78 of the stem 76 cannot move from the opening 60. Thus, the stem 76 of the carriage 20 is interlocked with the plunger 38 of the block 34a, as shown in FIGURE 4. If the carriage 20 continues to move toward the right, the block 34a is moved into juxtaposition with the block 34b.

For purposes of illustration, the block 34 shown in FIGURE 3 is selected as being block 34b. When the block 34a comes from the left and into juxtaposition with the block 34b, the stem 76 of the block 34a enters the opening 62 of the block 34b and moves into the opening 60 of the plunger 38 of the block 34b. As the carriage 20 continues to move toward the right, the block 34b is moved and the plungers 38 and 54 thereof move from alignment with a protuberance 92. Thus, the stem 76 of the block 34a is interlocked with the plunger 38 of the block 34b, as shown in FIGURE 4.

Upon continued movement of the carriage 20 toward the tailstock 14, the block 34b becomes juxtapositioned with the block 34c and the stem 76 of the block 34b moves into the opening 60 of the block 34c. With further movement toward the right, the stem 76 becomes interlocked with the plunger 38 of the block 34c, in a manner discussed above, and as shown in FIGURE 4.

Thus, the blocks 34a, 34b, and 34c are grouped together immediately to the right of the carriage 20, as shown in FIGURE 4. Thus, the blocks 34a, 34b, and 34c and the carriage 20 are coupled together, as shown in FIGURE 4.

Therefore, when the carriage 20 is again moved toward the left, the stem 76 which is attached to the carriage 20 pulls the block 34a with the carriage 20. Likewise, the stem 76 of the block 34a pulls the block 34b therewith and the stem 76 of the block 34b pulls the block 34c therewith as the carriage 20 moves toward the left.

Also, as shown in FIGURE 4, when the blocks 34 are in juxtaposition, each stud 80 extends through an opening 66 of its adjacent block 34 and is in engagement with the shoulder 64 of the plunger 38 thereof.

For purposes of illustration, the protuberances 92 along the rail are referred to as 92a, 92b, and 92c, the protuberance 92c being closest to the tailstock 14.

When the block 34a comes into alignment wtih the protuberance 92c, the plunger 54 of the block 34a is forced away from the rail 30. However, due to the fact that the stud 80 of the block 34b is in engagement with the shoulder 64 of the plunger 38 of the block 34a cannot move in a direction away from the rail 30. Thus, the stem 76 of the carriage 20 remains interlocked with the block 34a. So the block 34a continues to move to the left with movement of the carriage 20. Likewise, when the block 34b comes into alignment with the protuberance 92c, the stem 76 of the block 34a continues in interlocked relation with the block 34a as the stud 80 of the block 34c restrains the plunger 38 of the block 34b against movement.

With continued movement of the carriage 20 toward the left, the block 34c comes into alignment with the protuberance 92c. When this occurs, the plunger 54 is moved in a direction away from the rail 30 and also, due to the fact that there is no stud 80 in engagement with the shoulder 64 of the plunger 38 of the block 34c, the plunger 38 of the block 34c is forced in a direction away from the rail 30, as shown in FIGURE 5. When this occurs, the opening 60 through the plunger 38 of the block 34c is moved to coaxial relation with the head 78 of the stem 76 of the block 34b.

Thus, with further movement toward the left of the carriage 20, the stem 76 of the block 34b is withdrawn from the block 34c and the block 34c remains in alignment with the protuberance 92c, as shown in FIGURE 5. The block 34c thus supports the feed rod 26 and the lead screw 24 at the position of the protuberance 92c as the carriage 20 continues to move toward the left.

The block 34a does not stop at the protuberance 92b but continues to move to the left with the carriage 20 due to the fact that the stud 80 of the block 34b is in engagement with the shoulder 64 of the plunger 38 of the block 34a. However, when the block 34b comes into alignment with the protuberance 92b, the plunger 38 of the block 34b moves in a direction from the rail 30 and releases the stem 76 of the block 34a so that the block 34b becomes disconnected from the block 34a in the manner discussed above with respect to the positioning of the block 34c.

The block 34a continues in interconnected relation with the stem 76 of the carriage 20 until the block 34a is positioned in alignment with the protuberance 92a. As this occurs, the plunger 54 is forced in a direction away from the rail 30 and, in turn, forces the plunger 38 in a direction from the rail 30. Thus, the plunger 38 of the block 34a is released from latched relation with the stem 76 of the carriage 20.

Therefore, it is understood that the blocks 34 are automatically located at the positions of the spaced-apart protuberances 92 and the blocks 34 support the feed rod 26 and the lead screw 24 at the positions of the protuberances 92. The protuberances 92 may be located at any desired spaced intervals as the protuberances 92 are attached to the screws 90, as shown in FIGURE 5. Thus, the blocks 34 support the shafts 24 and 26 at spaced-apart positions while permitting the carriage 20 to move along the bed 16.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. In combination with a machine tool, rod carrier apparatus comprising a rail attached to the machine tool, a plurality of block members attached to the rail and slidably movable thereupon, a plurality of spaced-apart protuberances carried by the rail, a plurality of first plunger members, there being one first plunger member carried by each of the block members, each of the first plunger members being engageable with a protuberance when the block member is positioned so that the plunger member thereof is in alignment with the protuberance, each of the first plunger members being movable in a direction away from the rail, a plurality of second plunger members, there being one second plunger member carried by each of the block members, each of the second plunger members having a cavity within which the first plunger member of the respective block member is movable, resilient means within the cavity urging the first plunger member toward the rail, the second plunger member being reciprocally movable toward and away from the rail, resilient means urging the second plunger member toward the rail, the second plunger member having an aperture therethrough, a plurality of stem members, there being one stem member attached to each of a plurality of the block members, the stem member being movable through an aperture of a second plunger member of an adjacent block member, each stem member having a head portion larger than a body portion thereof, each aperture being slightly larger than the head portion of the adjacent stem member so that after the stem member is moved through the aperture the second plunger member can move with respect to the stem member to interlock the stem member with the plunger member, each second plunger member also having a shoulder portion, a plurality of stud members, each of some of the block members having a stud member attached thereto which is engageable with the shoulder of the second plunger member of an adjacent block member when the block members are in juxtaposed relation so that when a stud member is in engagement with the shoulder of a second plunger member said second plunger member is restrained against movement away from the rail member.

2. In combination with a lathe having a bed with a rotatable rod extending along the bed adjacent thereto, a rail extending along the bed and supported thereby, a plurality of blocks slidably attached to the rail and in supporting relation to the rod, a plurality of spaced-apart protuberant members attached to the rail, a plurality of first plunger members, there being one first plunger carried by each of the blocks, each first plunger member having a cavity therein adjacent the rail, a plurality of second plunger members, there being one second plunger member within each cavity and reciprocally movable toward and away from the rail, each second plunger member being engageable with one of the protuberant members when the said second plunger member is in alignment therewith, resilient means within each cavity urging the second plunger therein in a direction toward the rail, resilient means carried by each block and in engagement with the first plunger member thereof urging the first plunger member toward the rail, each first plunger member having a shoulder thereon, a plurality of stud members, there being one stud member attached to each of some of the blocks, each stud member being engageable with a shoulder of a first plunger of an adjacent block to prevent movement of said first plunger member in a direction away from the rail, a plurality of stem members, there being one stem member attached to each of some of the blocks and extending laterally therefrom, each first plunger member having an opening therein in substantial alignment with the stem member of an adjacent block so that the stem member is movable into the opening.

References Cited in the file of this patent

UNITED STATES PATENTS

| | | |
|---|---|---|
| 2,612,070 | Hoelscher | Sept. 30, 1952 |
| 2,885,920 | Livingston | May 12, 1959 |